United States Patent [19]

Chang et al.

[11] Patent Number: 5,420,182

[45] Date of Patent: May 30, 1995

[54] WATER-RETAINING ADHESIVE COMPOSITION

[75] Inventors: Rong-Shuh Chang; Tsai-Wie Tseng; Shinn-Jen Chang; Chien-Hsin D. Cheng, all of Hsinchu, Taiwan, Prov. of China

[73] Assignee: Industrial Technology Research Institute, Hsinchu, Taiwan, Prov. of China

[21] Appl. No.: 191,011

[22] Filed: Feb. 1, 1994

[51] Int. Cl.⁶ .................... C08K 5/3415; C08K 5/053; C08K 5/09; C08F 8/30
[52] U.S. Cl. .................... 524/104; 524/218; 524/225; 524/386; 524/388; 524/395; 524/458; 524/461; 525/374; 525/375
[58] Field of Search ............ 524/104, 386, 388, 458, 524/461, 395, 218, 225; 525/374, 379, 380, 375

[56] References Cited

U.S. PATENT DOCUMENTS

| | | | |
|---|---|---|---|
| 3,817,887 | 6/1974 | Mestetsky | 524/395 |
| 4,263,192 | 4/1981 | Sekmakas et al. | 524/388 |
| 4,522,956 | 6/1985 | Dhabhar et al. | 524/386 |
| 5,100,984 | 3/1992 | Bürge et al. | 526/264 |
| 5,143,773 | 9/1992 | Takuno | 428/137 |
| 5,151,461 | 9/1992 | Perrington et al. | 524/388 |

OTHER PUBLICATIONS

Aldrich Chemical Catalog, 1988–1989. p. 1250.

*Primary Examiner*—Tae H. Yoon
*Attorney, Agent, or Firm*—Darby & Darby

[57] ABSTRACT

A water retaining adhesive composition prepared by polymerizing and partially crosslinking 100 parts by weight of a 20 to 35 wt % solution of the acrylic polymer with 2 to 5 parts by weight of the amine group compound, amide group compound or amino group compound at a temperature of 20° C. to 80° C.; adjusting the pH value of the resultant partially crosslinked polymer to 6.0 to 7.0; and then sequentially compounding 10 to 40 parts by weight of modifiers and 2 to 5 parts by weight of water retaining agent in the partially crosslinked polymer. The modifier is a polyol, a polyalcohol or a poly(ether alcohol). The water retaining agent is 2-pyrrolidone-5-carboxylate.

18 Claims, No Drawings

WATER-RETAINING ADHESIVE COMPOSITION

BACKGROUND OF THE INVENTION

1. Field of the Invention

The present invention relates to an adhesive composition, and in particular to a water soluble adhesive composition having superior water resistance and water retention.

2. Background of the Invention

Water soluble adhesives used in the manufacture of pressure sensitive adhesive tapes normally contain water glue, dextrin or polyvinyl alcohol, and are usually applied to paper tapes to form adhesive tapes for use. When this kind of adhesive tapes are dried, they lose their rubber elasticity and viscosity, and consequently lose their pressure sensitive adhesive performance. Complicated apparatuses for imparting moisture to the surface of this kind of adhesive tapes prior to use are then required to recover the adhesive strength thereof.

Other water soluble adhesives suitable for use in pressure sensitive adhesive tapes, for example those containing polyvinyl alcohol, polyvinyl pyrrolidone, polyvinyl methyl ether, or copolymer of maleic anhydride and vinyl methyl ether as raw material exhibit bad water resistance and cohesion, and can not be preserved at high temperature or high humidity. If the adhesives are preserved for a prolonged period, the adhesives flow out and leak out due to the absorption of moisture, thereby causing a slippage of the adhesive tapes from the material or article to which they adhere. In order to obtain sufficient adhesive strength under low temperature and humidity, a large amount of low molecular water soluble modifiers are required to compound in the adhesives. The modified adhesives, however, when being used at an elevated temperature, will cause migration, making the adhering-surfaces move and thus diminishing the adhesive strength thereof.

Hydrophobic adhesives, that is, oil soluble adhesives, for example, those produced by using natural rubber or synthetic rubbers such as polyisoprene, polybutene, and polyisobutylene; acrylic resins such as ethylacrylate, 2-ethylhexyl acrylate, and isoctyl acrylate; and silicon polymers such as polydimethyl siloxane, polysilicate resin siloxane blends as raw materials, exhibit an enhanced adhesive strength, yet when the surface of the object to be adhered is wet, the adhesive strength is noticably reduced. And when the hydrophobic adhesive tapes are torn from the object they adhered, residues remain thereon and are not easy to remove. Also, the hydrophobic adhesives irritate human skin and are therfore not suitable for use with surgical tapes.

In addition, all of the above mentioned conventional adhesives do not show good water retention, and therefore when they are dried, their adhesive properties are reduced.

SUMMARY OF THE INVENTION

It is therefore an object of the invention to provide an adhesive composition solving such prior-art disadvantages.

In order to attain the above object, the adhesive composition of the invention is prepared by partially crosslinking an acrylic polymer with an amine, amide or amino group compound under suitable conditions to form a partially crosslinked polymer, and then neutralizing the partially crosslinked polymer with an alkaline aqueous solution and compounding in a water soluble modifier, followed by adding 2-pyrrolidone-5-carboxylate as water retaining agent.

According to an aspect of the invention, the adhesive composition has superior water retention, and thus the adhesive properties thereof will not change due to loss of moisture.

According to another aspect of the invention, the adhesive composition shows superior adhesive properties, water resistance, and no irritation to human skin, and therefore can be used in the manufacture of adhesive tapes for surgical applications and adhesive pads for transdermal dosage system.

According to further an aspect of the invention, as the adhesive composition has moderate adhesive strength, and is water soluble, when the adhesive tapes are torn from the articles to which they adhere, the residual adhesive tape can be easily wiped away with wet cloths.

The above and other objects and features of the present invention will become apparent from the complete description of this specification.

DETAILED DESCRIPTION OF THE INVENTION

The acrylic polymer suitable for use in the present invention includes, for example, polymers of acrylic acid, methyl acrylic acid, ethyl acrylate, butyl acrylate and their copolymers.

The amine group compounds, amide group compounds and amino group compounds according to the invention are used as a crosslinking agent of the acrylic polymers. The amine groups contained in the above compounds form ionic crosslinkings with the acrylic groups contained in the acrylic polymer, and thus impart a suitable degree of water resistance to the acrylic polymer. N-methylolacrylamide and polyamide are most suitable amine group compounds according to the present invention.

The polyol, polyalcohol and poly(ether alcohol) used in the present invention provide the adhesive composition with viscosity and flexibility. Suitable compounds include, for example, glycols such as, propylene glycol, ethylene glycol, polypropylene glycol/polyethylene glycol and ethyl glycol monoethyl ether, and glycerin.

The adhesive composition of the invention further includes 2-pyrrolidone-5-carboxylate as the water retaining agent. Suitable examples of this water retaining agent include sodium DL-2-pyrrolidone-5-carboxylate and potassium DL-2-pyrrolidone-5-carboxylate.

Broadly, the water-retaining adhesive composition may be produced from the following starting materials:

(a) from 5 to 50 percent by weight of an acrylic polymer;

(b) from 0.5 to 10 percent by weight of a compound selected from the group consisting of amine group compound, amide group compound, and amino group compound.

(c) from 10 to 60 percent by weight of a water-soluble modifier selected from the group consisting of polyol, polyalcohol, and poly(ether alcohol); and (d) from 0.5 to 10 percent by weight of 2-pyrrolidone-5-carboxylate as water-retaining agent.

The adhesive composition of the invention is preferably prepared by polymerizing and partially crosslinking 100 parts by weight of a 20 to 35 wt% solution of the acrylic polymer with 2 to 5 parts by weight of the amine group compound, amide group compound or amino group compound at a temperature of 20° C. to 80° C.; adjusting the pH value of the resulting partially crosslinked polymer to 6.0 to 7.0; and then sequentially compounding 10 to 40 parts by weight of modifiers and 2 to 5 parts by weight of water retaining agent in the partially crosslinked polymer to finish the process.

The following specific examples are intended to demonstrate the invention more fully without acting as a limitation upon its scope, since numerous modifications and variations will be apparent to those skilled in this art.

Example 1

To an one liter glass flask equipped with stirrer, thermometer, and condenser was added 100 g of methyl acrylic acid, 0.5 g of potassium persulfate and 200 g of deionized water, and stirred to form a mixture. The mixture was then allowed to polymerize at a temperature of 60° C. with the introduction of $N_2$ for 6-8 hours. After the completion of the polymerization, water was added to form an aqueous solution containing 30 wt% solid. The temperature was then lowered to room temperature and the viscosity was measured with a rotation viscosimeter. The viscosity of the resulting polymer was 5500 to 6000 cps (30° C.).

100 g of the obtained polymethacrylic acid was placed in an one liter glass flask equiped with stirrer, thermometer, and condenser. 3 g of N-carboxy methyl acrylamide was then added slowly and allowed to react at 60° C. for 3 hours to complete the-partially crosslinking reaction. Aqueous solution of sodium hydroxide was then added to neutralize the pH of the resulting product to 7. 25 g of glycerin and 1 g of sodium DL-2-pyrrolidone-5-carboxylate were then added and stirred for 2 hours. After dissolution completely, deionized water was added to form an aqueous solution containing 35 wt % of solid.

The resulting adhesive composition was applied on one surface of a 0.06 mm-thick rayon non-woven fabric to form a water soluble adhesive film of 0.04 mm thickness thereon. The fabric was then cut into test pieces for testing the adhesive strength, cohesion and water retention.

The adhesive strength of the adhesive composition of this example was determined as described below. The fabric was cut into test pieces of 200 mm×25 mm and was adhered to a copper plate paper. The test pieces were then torn at an angle of 180° with respect to the elongated direction of the test pieces at a speed of 30 cm/min to obtain the adhesive strength.

The cohesion of the adhesive composition of this example was measured as described below. The fabric was cut into test pieces of 10 mm×20 mm and adhered to an aluminum plate. A weight of 1 kg was then hung on the test piece in the shear direction of each test piece and the slip distance of the test pieces from the aluminum plate was measured at 20° C., 60% RH after 30 minutes to obtain the cohesion.

The water retention of the adhesive composition of the invention was measured as described below. The water soluble adhesive composition was coated on a glass plate to form a film of 0.1 mm thickness. The adhesive composition was heated and dried to constant weight and then transferred to a thermostat maintained at a constant temperature and humidity(20° C. 120% RH) for 5 hours The water content was then measured as the water retention.

The test results of the adhesive composition was listed in Table 1.

Example 2

The same reaction flask as in Example 1 was used, to which was added 85 g of acrylic acid, 15 g of butyl acrylate, 0.4 g of ammonium persulfate, 150 g of deionized water and 50 g of methanol, and then polymerized with the introduction of nitrogen at a temperature of 60° C. for 7 hours. Deionized water was added to form an aqueous solution containing 30 wt% solid. The temperature was then lowered to room temperature and the viscosity was measured with a rotation viscosimeter. The viscosity of the resulting polymer was 4600 to 5000 cps (30° C.).

2.5 g of N-hydroxymethyl acrylamide was then added in 100 g of the obtained polyacrylic acid aqueous solution and allowed to react at 60° C. for 3 hours to complete the partially crosslinking reaction. Aqueous solution of triethanolamine was then added to neutralize the pH of the resultant product to 7. 25 g of poly(vinyl alcohol) (PEG-600, Union Carbide Co. U.S.A.) and 1 g of sodium DL-2-pyrrolidone-5-carboxylate were then added and stirred for 2 hours. After dissolution completely, deionized water was added to form an aqueous solution containing 40 wt % of solid. The resulting adhesive composition was then tested according to the same procedures as set forth in Example 1, and the results are listed in Table 1.

Example 3

The same reaction flask as in Example 1 was used, to which was added 80 g of methyl acrylic acid, 20 g of ethyl acrylate, 0.5 g of ammonium persulfate, 100 g of deionized water and 100 g of ethanol, and then polymerized with the introduction of nitrogen at a temperature of 60° C. for 8 hours. Deionized water was added to form an aqueous solution of copolymer of methyl acrylic acid and ethyl acrylate. The aqueous solution contained 30 wt % solid.

2 g of N-carboxymethyl acrylamide was then added in 100 g of the obtained aqueous solution and allowed to react at 60° C. for 2.5 hours to complete the partially crosslinking reaction. Aqueous solution of potassium hydroxide was then added to neutralize the pH of the resultant product to 7. 30 g of poly(propylene alcohol)(PPG-400, Dow Chemical Co., U.S.A) and 1.5 g of sodium DL-2-pyrrolidone-5-carboxylate were then added. After dissolution completely, deionized water was added to form an aqueous solution containing 35 wt % of solid. The resulting adhesive composition was then tested according to the procedures as set forth in Example 1, and the results are listed in Table 1.

Example 4

100 g of 25 wt % polyacrylic acid aqueous solution (viscosity 8000–12000 cps, 30 ° C.) and 3 g of N-carboxy methyl acrylamide were polymerized at 70° C. for 3 hours for partial crosslinking. Sodium hydroxide was added to neutralize the pH value to 7.0 and 20 g of poly(ether alcohol)(GEP-2800, Dow Chemical Co., U.S.A.) and 1.5 g of sodium 2-pyrrolidone-5-carboxylate were added. Deionized water was then added to the resulting product to adjust the solid content thereof to 35 wt %. The viscosity of the resultant solution was measured as 6000 to 6500 cps(30° C.). The resulting product was tested according to the procedures as set forth in Example 1 and the test results are listed in Table 1.

Example 5

100 g of 25 wt % polyacrylic acid aqueous solution and 2.5 g of N-carboxy methyl acrylamide were polymerized at 60° C. for 3 hours for partial crosslinking. Potassium hydroxide was added to neutralize the pH value to 7.0 and 40 g of T-P400( polymer of triol and propylene oxide, Union Carbide Co., U.S.A.) and 1 g of sodium 2-pyrrolidone-5-carboxylate were added. Deionized water was then added to the resultant product to adjust the solid content thereof to 35 wt %. The viscosity of the resultant solution was measured as 5500 to 6000 cps(30° C.). The resulting product was tested according to the procedures set forth in Example 1, and the test results are listed in Table 1.

TABLE 1

| test item | conditions | Examples | | | | |
|---|---|---|---|---|---|---|
| | | 1 | 2 | 3 | 4 | 5 |
| adhesive strength (g/25 mm width) | 20° C., 60% RH | 680 | 650 | 720 | 760 | 750 |
| | 20° C., 80% RH | 660 | 640 | 700 | 740 | 720 |
| | 30° C., 60% RH | 670 | 650 | 720 | 760 | 750 |
| | 30° C., 80% RH | 650 | 630 | 710 | 740 | 720 |
| cohesion (mm) | 20° C., 60% RH | 0.2 | 0.5 | 0.1 | 0.1 | 0.1 |
| water retention (%) | absorption of water at 20° C., 80% RH for 5 hrs | 16 | 15 | 16 | 15 | 14 |

What is claimed is:

1. A water retaining adhesive composition produced from the following starting materials:
   (a) from 5 to 50 percent by weight of an acrylic polymer;
   (b) from 0.5 to 10 percent by weight of an N-methylolacrylamide or a polyamide having ionic crosslinking functionality;
   (c) from 10 to 60 percent by weight of a water soluble polyol or poly(ether alcohol) modifier; and
   (d) from 0.5 to 10 percent by weight of a 2-pyrrolidone-5-carboxylate water retaining agent.

2. The water retaining adhesive as claimed in claim 1, wherein the (a) material is present in an amount of from 15 to 40 percent by weight.

3. The water retaining adhesive as claimed in claim 1, wherein the (b) material is present in an amount of from 1 to 6 percent by weight.

4. The water retaining adhesive as claimed in claim 1, wherein the (c) material is present in an amount of from 20 to 50 percent by weight.

5. The water retaining adhesive as claimed in claim 1, wherein the (d) material is present in an amount of from 1 to 5 percent by weight.

6. The water retaining adhesive as claimed in claim 1, wherein the polyol of material (c) is glycerin.

7. The water retaining adhesive as claimed in claim 1, wherein the polyol of material (c) is propylene glycol.

8. The water retaining adhesive as claimed in claim 1, wherein the polyol is poly(propylene glycol).

9. The water retaining adhesive as claimed in claim 1, wherein the polyol is poly(ethylene glycol).

10. The water retaining adhesive as claimed in claim 1, wherein the 2-pyrrolidone-5-carboxylate is sodium DL-2-pyrrolidone-5-carboxylate.

11. The water retaining adhesive as claimed in claim 1, wherein the 2-pyrrolidone-5-carboxylate is potassium DL-2-pyrrolidone-5-carboxylate.

12. A method for the preparation of a water-retaining adhesive comprising the following steps:
   (1) partially crosslinking 100 parts by weight of a 20 to 35 wt % solution of an acrylic polymer with 2 to 5 parts by weight of an amine group-containing compound having ionic crosslinking functionality at a temperature of 20° to 80° C.;
   (2) adjusting the pH of the resultant partially crosslinked polymer to 6 to 7; and
   (3) compounding the partially crosslinked polymer with a water-soluble polyol or poly(ether alcohol) modifier and a 2-pyrrolidone-5-carboxylate water-retaining agent.

13. The method as claimed in claim 12, wherein the crosslinking is conducted at a temperature of 40° to 60° C.

14. The method of claim 12 wherein the polyol of the water-soluble modifier is glycerin.

15. The method of claim 12 wherein the polyol of the water-soluble modifier is propylene glycol.

16. The method of claim 12 wherein the polyol is poly(propylene glycol).

17. The method of claim 12 wherein the polyol is poly(ethylene glycol).

18. The method of claim 12 wherein the 2-pyrrolidone-5-carboxylate is sodium or potassium DL-2-pyrrolidone-5-carboxylate.

* * * * *

UNITED STATES PATENT AND TRADEMARK OFFICE
CERTIFICATE OF CORRECTION

PATENT NO. : 5,420,182
DATED : May 30, 1995
INVENTOR(S) : Rong-Shuh CHANG et al.

It is certified that error appears in the above-indentified patent and that said Letters Patent is hereby corrected as shown below:

Title page item: [75] Inventors: Change "Prov. of China" to --Republic of China--;

[73] Assignee: Change "Prov. of China" to --Republic of China--.

Signed and Sealed this

Twenty-second Day of August, 1995

Attest:

BRUCE LEHMAN

*Attesting Officer*   *Commissioner of Patents and Trademarks*